United States Patent
Horie et al.

(10) Patent No.: US 10,597,500 B2
(45) Date of Patent: Mar. 24, 2020

(54) METHOD FOR PRODUCING COMPOSITE MATERIAL AND COMPOSITE MATERIAL

(71) Applicant: MITSUBISHI GAS CHEMICAL COMPANY, INC., Tokyo (JP)

(72) Inventors: Shigeru Horie, Tokyo (JP); Nobuhiko Matsumoto, Kanagawa (JP); Kousuke Ikeuchi, Tokyo (JP); Masao Someya, Tokyo (JP)

(73) Assignee: MITSUBISHI GAS CHEMICAL COMPANY, INC., Tokyo (JP)

( * ) Notice: Subject to any disclaimer, the term of this patent is extended or adjusted under 35 U.S.C. 154(b) by 0 days.

(21) Appl. No.: 16/317,922

(22) PCT Filed: Jul. 13, 2017

(86) PCT No.: PCT/JP2017/025481
§ 371 (c)(1),
(2) Date: Jan. 15, 2019

(87) PCT Pub. No.: WO2018/012567
PCT Pub. Date: Jan. 18, 2018

(65) Prior Publication Data
US 2019/0248967 A1    Aug. 15, 2019

(30) Foreign Application Priority Data

Jul. 15, 2016   (JP) ................................. 2016-139900
May 9, 2017   (JP) ................................. 2017-093103

(51) Int. Cl.
*C08J 5/04*        (2006.01)
*B29C 70/48*    (2006.01)
*C08G 69/04*    (2006.01)

(52) U.S. Cl.
CPC ................. *C08J 5/04* (2013.01); *B29C 70/48* (2013.01); *C08G 69/04* (2013.01); *B29K 2995/0094* (2013.01)

(58) Field of Classification Search
CPC ............. C08J 5/04; B29C 70/48; C08G 69/04
USPC ....................................................... 524/494
See application file for complete search history.

(56) References Cited

U.S. PATENT DOCUMENTS

| | | | |
|---|---|---|---|
| 4,927,583 A | 5/1990 | Lottiau et al. | |
| 5,223,335 A | 6/1993 | Inata et al. | |
| 6,594,892 B2 * | 7/2003 | Ohya | H05K 3/0011 29/846 |
| 2009/0246468 A1 | 10/2009 | Schubiger | |
| 2014/0316063 A1 | 10/2014 | Hochstetter et al. | |
| 2015/0165651 A1 | 6/2015 | Yao et al. | |
| 2017/0037204 A1 | 2/2017 | Briffaud et al. | |
| 2017/0361547 A1 | 12/2017 | Cauchois et al. | |

FOREIGN PATENT DOCUMENTS

| | | |
|---|---|---|
| JP | 59-157121 | 9/1984 |
| JP | 63-82731 | 4/1988 |
| JP | 1988-082731 A | 4/1988 |
| JP | 1989-299838 A | 12/1989 |
| JP | 5-178985 | 7/1993 |
| JP | 1993-178985 A | 7/1993 |
| JP | 5-271403 | 10/1993 |
| JP | 1993-271403 A | 10/1993 |
| JP | 2011-516654 | 5/2011 |
| JP | 2013-173872 | 9/2013 |
| JP | 2013-173872 A | 9/2013 |
| JP | 2015-17184 | 1/2015 |
| JP | 2015-017184 A | 1/2015 |
| JP | 2015-501360 | 1/2015 |
| JP | 2015-522682 | 8/2015 |
| JP | 2015-522682 A | 8/2015 |
| WO | 2015/159015 | 10/2015 |
| WO | 2015/159015 A | 10/2015 |
| WO | 2016/087789 | 6/2016 |
| WO | 2016/087789 A1 | 6/2016 |

OTHER PUBLICATIONS

Van Rijswijk et al., "Texitile fiber-reinforced anionic", 2009, pp. 1-10, vol. 40.
Official Communication issued in WIPO Patent Application No. PCT/JP2017/025481, dated Sep. 12, 2017.
Japanese Office Action, Japanese patent Office, Application No. 2018-527651, dated Oct. 30, 2018, with English abstract.
Japanese Office Action, Japanese patent Office, Application No. 2018-527651, dated Feb. 20, 2019, with English abstract.

* cited by examiner

Primary Examiner — Deve V Hall
(74) Attorney, Agent, or Firm — Greenblum & Bernstein, P.L.C.

(57) ABSTRACT

An object of the invention is achieved by a method for producing a composite material, including the steps of combining a resin precursor and a reinforcing fiber and carrying out a polymerization reaction of the resin precursor. That is, a thermoplastic resin composite material having high strength can be obtained by the production method.

17 Claims, 1 Drawing Sheet

[Figure 1]
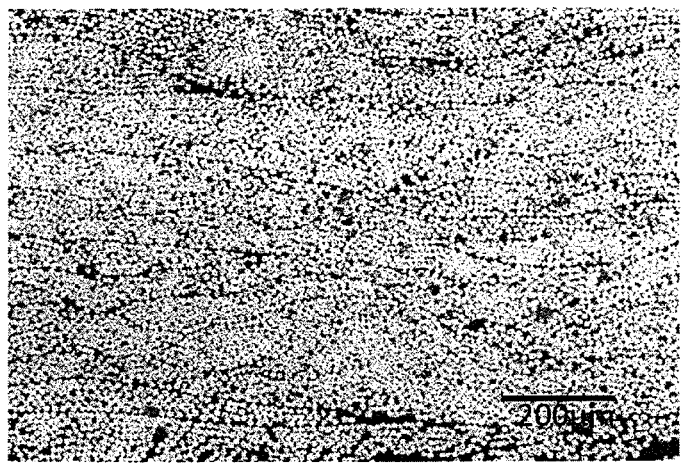
[Figure 2]
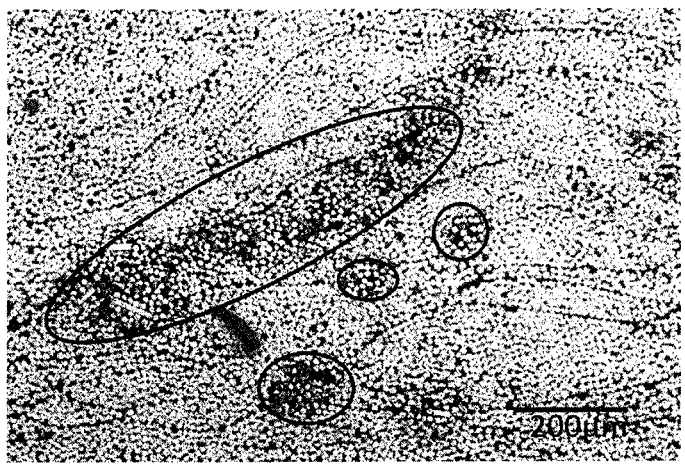

METHOD FOR PRODUCING COMPOSITE MATERIAL AND COMPOSITE MATERIAL

TECHNICAL FIELD

The present invention relates to a method for producing a composite material and to the composite material.

BACKGROUND ART

Composite materials are used as constructional materials in a variety of technical fields such as in aerospace applications, aircrafts, wind power generation, automobiles, and marine applications. Such composite materials are more lightweight than metal materials and are therefore expected to be demanded in automobile industry or the like mainly for the purpose of, for example, improvement of fuel efficiency.

For the use in automobile industry or the like, materials using thermoplastic resins have been investigated from the viewpoint of productivity and recyclability. However, thermoplastic resins have high viscosity, and thus mixing a thermoplastic resin with a reinforcing material such as fibers involves the problems of formation of voids at the interface between the resin and the reinforcing material and uneven distribution of the reinforcing material, because of which the resulting mechanical strength is low. Further, these problems substantially preclude dense filling with the reinforcing material.

In an effort to improve the degree of impregnation of a reinforcing material such as reinforcing fibers, Patent Literature 1 discloses a method in which the reinforcing material is impregnated with a low-viscosity monomer such as ε-caprolactam or cyclic butylene terephthalate and then the monomer is converted to a polymer by ring-opening polymerization. Such polymerization generates substantially no gases and allows production of a composite material free of voids. However, there were the following problems: the polymerization from a monomer cannot yield a sufficiently high molecular weight to achieve a high strength; and the type of the resin is limited.

According to Patent Literature 2, a chain extender is added to a reactive prepolymer of low viscosity, and further polymerization is performed after impregnation. This requires the step of mixing the prepolymer and the chain extender before fiber impregnation and is disadvantageous in terms of working efficiency.

Patent Literature 3 describes a method for obtaining a composite material with high mechanical strength by impregnation of reinforcing fibers with a polyamide oligomer, followed by pultrusion molding. With this method, small molecules formed during polymerization of the prepolymer remain, and the remaining small molecules may cause polymerization to proceed insufficiently or voids to be formed, apprehensively leading to poor properties of the resulting composite material.

CITATION LIST

Patent Literature

Patent Literature 1: National Publication of International Patent Application No. 2011-516654
Patent Literature 2: National Publication of International Patent Application No. 2015-501360
Patent Literature 3: Japanese Patent Laid-Open No. 63-82731

SUMMARY OF INVENTION

Technical Problem

It is an object of the present invention to provide a method for producing a high-strength composite material.

Solution to Problem

As a result of intensive investigations aimed at achieving the object, the present inventors have found that a high-strength composite material can be obtained by a method for producing a composite material, the method comprising the steps of combining a resin precursor and a reinforcing fiber and polymerizing the resin precursor. Based on this finding, the inventors have completed the present invention.

It has also been discovered that this method can yield a composite material having very high strength when the polymerization is performed along with pressing under vacuum (under reduced pressure).

That is, the present invention is defined as follows.
<1> A method for producing a composite material, comprising the steps of: combining a resin precursor and a reinforcing fiber; and polycondensing the resin precursor.
<2> The method for producing a composite material according to <1>, wherein the resin precursor is an oligomer of a thermoplastic resin.
<3> The method for producing the composite material according to <1> or <2>, wherein the resin precursor has a viscosity of from 1 to 100 Pa·s.
<4> The method for producing the composite material according to any one of <1> to <3>, wherein the resin precursor comprises at least one selected from the group consisting of polyamide, polyester, polycarbonate, polyether, polysulfide, and ketone-based resin.
<5> The method for producing the composite material according to any one of <1> to <4>, wherein the reinforcing fiber comprises at least one selected from the group consisting of glass fiber, carbon fiber, basalt fiber, SiC fiber, and organic fiber.
<6> The method for producing the composite material according to any one of <1> to <5>, wherein a proportion of the reinforcing fiber in the composite material is from 1 to 90 vol %.
<7> The method for producing the composite material according to any one of <1> to <6>, wherein the reinforcing fiber is a discontinuous fiber material.
<8> The method for producing the composite material according to <7>, wherein the discontinuous fiber material comprises at least one selected from the group consisting of a roving, a non-woven fabric, and a tape.
<9> The method for producing the composite material according to <7> or <8>, wherein the discontinuous fiber material has a fiber length of from 0.5 mm to 100 mm.
<10> The method for producing the composite material according to any one of <1> to <6>, wherein the reinforcing fiber is a continuous fiber material.
<11> The method for producing the composite material according to <10>, wherein the continuous fiber material is unidirectional fiber, a woven fabric, a knitted fabric, or a braided fabric.
<12> The method for producing the composite material according to any one of <1> to <11>, wherein in the step of combining, the combining is performed by any one of an immersion process, an impregnation process, and a kneading process.

<13> The method for producing the composite material according to any one of <1> to <12>, wherein a reaction temperature in the step of polycondensing is from 100° C. to 400° C.

<14> The method for producing the composite material according to any one of <1> to <13>, wherein a degree of reduced pressure in a reaction in the step of polycondensing is from 0 to 0.095 MPa.

<15> The method for producing the composite material according to any one of <1> to <14>, wherein in the step of polycondensing, pressing is simultaneously performed.

<16> The method for producing the composite material according to <15>, wherein the pressing is performed by a vacuum pressing process.

<17> The method for producing the composite material according to <16>, wherein a pressure of the vacuum pressing process is from 0.1 to 30 MPa.

<18> A composite material produced by the method according to any one of <1> to <17>.

Advantageous Effects of Invention

The production method of the present invention is capable of producing a thermoplastic resin composite material having good mechanical properties.

BRIEF DESCRIPTION OF DRAWINGS

FIG. 1 shows a cross-sectional SEM image of a composite material (free of voids) obtained in Example 2.

FIG. 2 shows a cross-sectional SEM image of a composite material (having voids) obtained in Comparative Example 2.

DESCRIPTION OF EMBODIMENTS

An embodiment of the present invention (hereinafter referred to as "present embodiment") will now be described. The following embodiment is an example given by way of illustration of the present invention, and the present invention is not limited only to the present embodiment.

The present invention is a method for producing a composite material, comprising the steps of combining a resin precursor and a reinforcing fiber and polymerizing the resin precursor.

Being thus designed, the method for producing a composite material according to the present embodiment is capable of allowing the resin to fully impregnate gaps present in the reinforcing fiber and producing a composite material with a reduced volume of voids and improved mechanical properties. This composite material is excellent in terms of productivity and recyclability.

The composite material according to the present embodiment is a material comprising a thermoplastic resin and a reinforcing fiber. Specific preferable examples of the thermoplastic resin in the present embodiment comprise a resin resulting from a condensation reaction, and examples of the resin include polyamide, polyester, polycarbonate, polyether, polysulfide and ketone-based resin.

These resins may be used alone, or a mixture of two or more thereof may be used.

(Resin Precursor)

The resin precursor may be any precursor the polymerization of which gives a resin and may be a monomer for forming the resin. The resin precursor is preferably an oligomer composed of monomers bonded.

This oligomer is preferably one obtained by a polycondensation reaction of a reactive monomer serving as a structural unit, because in this case the present invention exerts its effect to a greater extent. Upon heating of such a resin precursor under a reduced-pressure condition, the remaining terminal functional groups undergo further polycondensation leading to a molecular weight increase, in consequence of which the resin precursor can be converted to a thermoplastic resin (polymer).

When the resin is a thermoplastic resin, the melt viscosity of the resin precursor is preferably, but not limited to, from 1 to 100 Pa·s, more preferably from 1 to 80 Pa·s, at a temperature at which the resin precursor and the reinforcing fiber are combined.

The resin precursor preferably has different types of functional terminals derived from the structural component and can, for example, have two types of functional terminals (X, Y). For example, the resin precursor may be a composition comprising two or more of the components of the following formulae (1) to (3) or may consist of the component of the formula (2) alone.

X—C—X Formula (1)

X—C—Y Formula (2)

Y—C—Y Formula (3)

C in the formulae (1) to (3) represents a polycondensation product of monomer structural units used as a starting material for the thermoplastic resin. The number of monomer structural units is not particularly limited, although an increase in the number of the structural units provides an increase in molecular weight and an increase in viscosity at thermal melting. The melt viscosity of the resin precursor is preferably 100 Pa·s or less, and hence the number of monomer structural units (the degree of polymerization) is preferably a value at which such a preferred melt viscosity can be achieved. C may be an aliphatic, aromatic or heterocyclic product, or may be a mixture of two or more thereof.

When the resin precursor is a composition comprising two or more of the components of the formulae (1) to (3), examples of such a mixture include a mixture of the components of the formulae (1) and (2), a mixture of the components of the formulae (1) and (3), and a mixture of the components of the formulae (1), (2), and (3).

The resin precursor preferably comprises at least one selected from the group consisting of precursors of polyamide, polyester, polycarbonate, polyether, polysulfide and ketone-based resin. Among these, oligomers of polyamide, polyester, and polycarbonate are more preferred. These resin precursors may be used alone, or two or more thereof may be included to be used together.

(Polyamide Resin)

The polyamide resin is made up of two structural components, a diamine component and a dicarboxylic acid component, and the resin precursor represented by the above formulae (1) to (3) is made up of the same structural components. An amino acid, a peptide, or the like having both an amino group and a carboxyl group as terminal functional groups can also be used as a structural component of the polyamide resin.

(Polyester Resin)

The polyester resin is made up of two structural components, a diol component and a dicarboxylic acid component, and the resin precursor represented by the formulae (1) to (3) is made up of the same structural components. An amino acid, a peptide, or the like having both a hydroxy group and a carboxyl group as terminal functional groups can also be used as a structural component of the polyester resin.

(Polycarbonate Resin)

The polycarbonate resin is made up of two structural components, a diol component and a carbonic acid diester component or phosgene, and the resin precursor represented by the formulae (1) to (3) is made up of the same structural components.

The type of the diamine component is not particularly limited, and specific examples thereof include: aliphatic diamines such as tetramethylenediamine, pentamethylenediamine, 2-methylpentanediamine, hexamethylenediamine, heptamethylenediamine, octamethylenediamine, nonamethylenediamine, decamethylenediamine, dodecamethylenediamine, 2,2,4-trimethyl-hexamethylenediamine, and 2,4,4-trimethylhexamethylenediamine; alicyclic diamines such as 1,3-bis(aminomethyl)cyclohexane, 1,4-bis(aminomethyl)cyclohexane, 1,3-diaminocyclohexane, 1,4-diaminocyclohexane, bis(4-aminocyclohexyl)methane, 2,2-bis(4-aminocyclohexyl)propane, bis(aminomethyl)decalin, and bis(aminomethyl)tricyclodecane; and aromatic ring-containing diamines such as m-xylylenediamine, p-xylylenediamine, bis(4-aminophenyl)ether, p-phenylenediamine, and bis(aminomethyl)naphthalene. One or two or more structural units derived from these diamines may be contained. In particular, in order to achieve high toughness, diamines having an aromatic skeleton such as m-xylylenediamine or a mixture of m-xylylenediamine and p-xylylenediamine are more preferred.

The type of the dicarboxylic acid component is not particularly limited, and examples thereof include: aromatic dicarboxylic acids such as terephthalic acid, isophthalic acid, and 2,6-naphthalenedicarboxylic acid; and aliphatic dicarboxylic acids such as succinic acid, glutaric acid, adipic acid, pimelic acid, suberic acid, azelaic acid, sebacic acid, 1,10-decanedicarboxylic acid, 1,11-undecanedicarboxylic acid, 1,12-dodecanedicarboxylic acid, 1,14-tetradecanedicarboxylic acid, 1,16-hexadecanedicarboxylic acid, 1,18-octadecanedicarboxylic acid, oxalic acid, and malonic acid.

The type of the diol component is not particularly limited, and examples thereof include 1,1'-biphenyl-4,4'-diol, bis(4-hydroxyphenyl)methane, 1,1-bis(4-hydroxyphenyl)ethane, bis(4-hydroxyphenyl)ether, bis(4-hydroxyphenyl)sulfoxide, bis(4-hydroxyphenyl)sulfide, bis(4-hydroxyphenyl)sulfone, bis(4-hydroxyphenyl)ketone, 2,2-bis(4-hydroxy-3-tert-butylphenyl)propane, 2,2-bis(4-hydroxy-3-methylphenyl)propane [=bisphenol C], 1,1-bis(4-hydroxyphenyl)cyclopentane, 1,1-bis(4-hydroxyphenyl)cyclohexane [=bisphenol Z], 2,2-bis(4-hydroxyphenyl) hexafluoropropane, bis(4-hydroxyphenyl)diphenylmethane, 1,1-bis(4-hydroxyphenyl)-1-phenylethane, 9,9-bis(4-hydroxyphenyl)fluorene, 9,9-bis(4-hydroxy-3-methylphenyl)fluorene, α,ω-bis[2-(p-hydroxyphenyl) ethyl]polydimethylsiloxane, α,ω-bis[3-(o-hydroxyphenyl) propyl]polydimethylsiloxane, and 4,4'-[1,3-phenylenebis(1-methylethylidene)]bisphenol.

The type of the carbonic acid diester is not particularly limited, and specific examples thereof include diphenyl carbonate, ditolyl carbonate, bis(chlorophenyl) carbonate, m-cresyl carbonate, dimethyl carbonate, diethyl carbonate, dibutyl carbonate, and dicyclohexyl carbonate.

The polyether resin can be obtained by condensing a diol compound having an alkyl group in the skeleton, such as ethylene glycol, or a compound having an aromatic ring in the skeleton, such as a hydroquinone derivative or a bisphenol derivative, as a starting material.

The polysulfide resin can be obtained by condensing a compound such as p-bromothiophenol as a starting material.

The ketone-based resin is a polyetherketone resin such as PEK (polyetherketone), PEEK (polyetheretherketone), or PEKK (polyetherketoneketone), and can be obtained by condensing a fluorine group-containing compound and a hydroxy group-containing compound as starting materials.

The polymerization reaction is preferably a condensation reaction. The method for the condensation reaction is not limited to any particular reaction method. Typically, the condensation reaction is carried out by a method in which the degree of polymerization is controlled below a certain level in the course of synthesis of a condensed resin so as to allow a large amount of unreacted functional groups to remain. That is, the reaction is carried out under temperature and pressure conditions milder than conditions for synthesis of thermoplastic resins obtained by common polycondensation.

For example, in one of the present embodiment, a resin precursor of polyamide may be obtained by polycondensing a diamine component and a dicarboxylic acid component as starting materials for the polyamide. For example, a resin precursor of polyamide can be produced by a method in which a nylon salt composed of a diamine component and a dicarboxylic acid component is heated in a pressurized state in the presence of water and polymerized in a molten state. Alternatively, a resin precursor of polyamide can be produced by a method in which a diamine component is directly added to a dicarboxylic acid component in a molten state and in which these components are polycondensed at ordinary pressure or increased pressure. During the period, the polycondensation is allowed to proceed, while the temperature of the reaction system is elevated so that the reaction temperature will not decrease below the melting points of the oligoamide and polyamide to be produced.

In production of a resin precursor of polyamide, a phosphorus atom-containing compound may be added to the polycondensation reaction system for the purpose of promotion of amidation reaction and prevention of coloring. Examples of the phosphorus atom-containing compound include phosphinic acid compounds such as dimethylphosphinate and phenylmethylphosphinate; hypophosphorous compounds such as hypophosphorous acid, sodium hypophosphite, potassium hypophosphite, lithium hypophosphite, magnesium hypophosphite, calcium hypophosphite, and ethyl hypophosphite; phosphonic acid compounds such as phosphonic acid, sodium phosphonate, potassium phosphonate, lithium phosphonate, potassium phosphonate, magnesium phosphonate, calcium phosphonate, phenylphosphonic acid, ethylphosphonic acid, sodium phenylphosphonate, potassium phenylphosphonate, lithium phenylphosphonate, diethyl phenylphosphonate, sodium ethylphosphonate, and potassium ethylphosphonate; phosphonous acid compounds such as phosphonous acid, sodium phosphonite, lithium phosphonite, potassium phosphonite, magnesium phosphonite, calcium phosphonite, phenylphosphonous acid, sodium phenylphosphonite, potassium phenylphosphonite, lithium phenylphosphonite, and ethyl phenylphosphonite; and phosphorous acid compounds such as phosphorous acid, sodium hydrogen phosphite, sodium phosphite, lithium phosphite, potassium phosphite, magnesium phosphite, calcium phosphite, triethyl phosphite, triphenyl phosphite, and pyrophosphorous acid.

Among these, metal hypophosphites such as sodium hypophosphite, potassium hypophosphite, and lithium hypophosphite are preferably used to promote the amidation reaction, and sodium hypophosphite is particularly preferred. Phosphorus atom-containing compounds that can be used in the present invention are not limited to the compounds mentioned above.

From the viewpoint of control of the rate of the polycondensation reaction, an alkali metal compound may be additionally present in the polycondensation reaction system.

An alkali metal hydroxide or an alkali metal acetate is typically used as the alkali metal compound. However, the above-mentioned phosphorus atom-containing compounds containing an alkali metal are excluded. Specific examples of the alkali metal compound include lithium hydroxide, sodium hydroxide, potassium hydroxide, rubidium hydroxide, cesium hydroxide, lithium acetate, sodium acetate, potassium acetate, rubidium acetate, and cesium acetate, and at least one selected from sodium hydroxide and sodium acetate is preferred. These may be used alone, or two or more thereof may be used in combination.

In the present embodiment, polymerization is allowed to further proceed after the resin precursor is combined with a reinforcing fiber. If the polymerization is polycondensation and the polycondensation is excessive, the following problems may arise: the amount of eliminated components is so large that they are difficult to remove and act to cause formation of voids; and the flexibility and toughness of the resulting resin are lower than desired levels. The maximum degree of polymerization should therefore be controlled. Examples of the method for this purpose include making the amounts of the above-described functional groups X and Y slightly differ from their equivalents. When the equivalent of the group X is denoted by x and the equivalent of the group Y is denoted by y, the value of x/y is typically 0.90 to x/y to 1.1, more preferably 0.95 to x/y to 1.05, and even more preferably 0.99 to x/y to 1.01.

An alternative method for controlling the maximum degree of polymerization may be to add an appropriate amount of monomer component having only one functional group. The amount of the added monomer having only one functional group is from 0.1 to 10 eq %, preferably from 0.5 to 5 eq %, and more preferably from 0.6 to 3 eq %, based on the monomer component having two or more functional groups.

In the present embodiment, the reinforcing fiber preferably comprises at least one selected from the group consisting of glass fiber, carbon fiber, basalt fiber, SiC fiber, and organic fiber. For example, it is more preferable to use inorganic fiber such as glass fiber, carbon fiber, basalt fiber and SiC fiber, or organic fiber such as aramid fiber and hemp fiber. Among these, it is even more preferable to use inorganic fiber such as glass fiber, carbon fiber, basalt fiber and SiC fiber, and it is particularly preferable to use glass fiber or carbon fiber.

The proportion of the reinforcing fiber in a composite material is preferably from 1 to 90 vol %. That is, the content ratio of the reinforcing fiber in a composite material obtained by combining a resin precursor and the reinforcing fiber and polymerizing the resin precursor is preferably from 1 to 90 vol % based on the volume of the formed article. In order to ensure good working efficiency and obtain high mechanical strength, the content ratio of the reinforcing fiber is more preferably from 20 to 70 vol % and even more preferably from 25 to 55 vol %.

In order to obtain high strength, it is advantageous that the content ratio of the reinforcing fiber be high. However, an increase in the content ratio of the reinforcing fiber may fail to sufficiently impregnate the gaps present in the reinforcing fiber with the resin as a matrix, thus leading to formation of voids in the resulting composite material. Such formation of voids significantly reduces the strength of the composite material. However, with the method of the present embodiment, the resin can completely impregnate the gaps present in the reinforcing fiber even when the content ratio of the reinforcing fiber is high and, therefore, the content ratio of the reinforcing fiber can be increased without a strength reduction due to void formation. From this viewpoint, the lower limit of the content ratio of the reinforcing fiber can be 40 vol % or more, can be 45 vol % or more, or can be 50 vol % or more.

A discontinuous fiber material can be used as the reinforcing fiber. The discontinuous fiber material is preferably in a form in which the fiber length-to-fiber diameter ratio is 50 or more, more preferably 1000 or more. The reinforcing fiber preferably comprises, for example, at least one selected from the group consisting of a roving, a non-woven fabric and a tape form. A continuous fiber material refers to a reinforcing fiber for forming a composite material, the reinforcing fiber having a continuous body without discontinuity. A discontinuous fiber material refers to any fiber material other than the continuous fiber material.

The fiber length of the discontinuous fiber material is preferably from 0.5 mm to 100 mm. In order to allow the composite material to retain high mechanical strength and formability, the fiber length is more preferably from 10 to 80 mm and even more preferably from 20 to 50 mm.

A continuous fiber material can be used as the reinforcing fiber and, in this case, the continuous fiber material is more preferably unidirectional fiber, a woven fabric, a knitted fabric or a braided fabric form. The woven fabric, knitted fabric or braided fabric as the continuous fiber material is preferably for example a biaxial or multiaxial woven fabric, knitted fabric or braided fabric.

The use of the discontinuous fiber material or continuous fiber material as described above improves the degree of reinforcement of the composite material and enables production of a formed article that exhibits better mechanical properties.

The non-woven fabric is a sheet made of the reinforcing fiber stacked and bonded three-dimensionally, and examples of the non-woven fabric include a random mat, a paper material, and felt.

The glass fiber used can be in the form of a glass fiber roving, glass fiber non-woven fabric, glass fiber woven fabric, glass fiber knitted fabric, or glass fiber tape. The glass fiber may include short glass fiber such as milled glass fiber. Examples of such glass fiber include E-glass, S-glass, and C-glass, among which E-glass is preferred. The cross-sectional shape of the monofilaments of the glass fiber may be a circular shape or a flattened shape such as an elliptical shape.

The carbon fiber used can, like the above glass fiber, be in any of various forms made of carbon fiber.

Specifically, carbon fiber is classified into the following three types: "pitch-based" carbon fiber produced from coal-tar pitch or petroleum pitch; "PAN-based" carbon fiber produced from polyacrylonitrile; and "rayon-based" carbon fiber produced from fibrous cellulose. Any type of carbon fiber can be used in the present embodiment.

(Step of Combining Resin Precursor and Reinforcing fiber)

The step of combining a resin precursor and a reinforcing fiber is a step of creating a state where the resin precursor exists around each reinforcing fiber. The method for combining may be any method which can create a state in which the resin precursor exists around each reinforcing fiber, and examples of the method include, but are not limited to, mixing processes such as an immersion process, an impregnation process, and a kneading process. Examples of the immersion process include a pultrusion process, a prepreg process, and a winding process. Examples of the impregnation process include impregnation by means of a press, a double-belt press, or the like and a transfer molding process.

The step of combining a resin precursor and a reinforcing fiber does not require any special procedures as long as a state can be created in which the resin precursor exists around each reinforcing fiber. The combining may be accomplished, for example, by adding (pouring or sprinkling) the resin precursor in a molten state to the reinforcing fiber dispersed to an appropriate extent.

At the time of combining, the resin precursor may be a liquid or a solid such as a powder.

The kneading process is preferably any one of stirring, melt kneading, or roll kneading. When the reinforcing fiber is in the form of cut pieces of roving, a method more preferred from the viewpoint of productivity is melt kneading performed using a stirrer, a uniaxial or biaxial kneader, or a roll kneader under temperature conditions where the resin melts.

(Step of Polymerizing the Resin Precursor)

In the present embodiment, after the resin precursor and the reinforcing fiber are combined as described above, the resin precursor is polymerized to a higher degree of polymerization and converted to a polymer by, for example, the condition of a temperature increase to a temperature higher than that at which the functional groups contained in the precursor undergo polycondensation. The polymerization results in a composite material that exhibits high mechanical strength.

In the step of polymerizing the resin precursor, the polymerization reaction is preferably a polycondensation reaction, depending on the type of the resin precursor.

The reaction temperature for the polymerization reaction is preferably from 100° C. to 400° C. The temperature for the polymerization reaction is adjusted according to the type of the resin precursor, i.e., according to the type of the structural component (monomer) used as the resin starting material or the degree of polymerization of the resin precursor. When the polymerization is carried out under a reduced-pressure condition as described below, the temperature is more preferably from 150 to 400° C. and even more preferably from 200 to 400° C. in order to more easily accomplish the polymerization or improve the degree of impregnation of the reinforcing fiber with the resin. Such a polymerization reaction temperature is preferred also for, for example, removal of small molecules generated during polycondensation under a reduced-pressure condition or removal of small molecules (monomer) that are difficult to thermally melt.

The step of polymerizing the resin precursor can be performed under vacuum (in a reduced-pressure atmosphere), although this is not limiting. Employing a reduced-pressure condition for the polymerization reaction allows the polymerization to proceed efficiently with removal of condensation-derived small molecules from the reaction system and also makes it possible to obtain a high-strength composite material. The degree of vacuum (degree of reduced pressure) in the polymerization reaction only needs to be sufficient for removal of small molecules and is preferably from 0 to 0.095 MPa, more preferably from 0 to 0.08 MPa, even more preferably from 0 to 0.02 MPa, and particularly preferably from 0.0001 to 0.01 MPa. The degree of vacuum (degree of reduced pressure) specified herein is an absolute pressure.

The step of combining a resin precursor and a reinforcing fiber and the step of polymerizing the resin precursor may be performed sequentially or simultaneously.

Pressing the composite material during the polymerization reaction can result in a high-strength composite material. In particular, when the polymerization reaction is allowed to proceed along with pressing under vacuum, the strength of the composite material can be further increased. From the viewpoint of strength, the degree of vacuum in this case is preferably 0.08 MPa or less, more preferably 0.01 MPa or less, even more preferably 0.009 MPa or less, and particularly preferably 0.005 MPa or less.

Specifically, it is preferable to use a vacuum pressing process, and in this case forming can also be performed simultaneously. The vacuum pressing process is more preferably a continuous pressing process or a multi-stage pressing process. With the multi-stage pressing process, a plurality of materials can be collectively vacuum-pressed in a batch manner to compensate for the shortcomings in terms of mass production efficiency.

Alternatively, continuous pressing which is more superior in terms of mass production efficiency can be employed.

When the step of combining and the step of polymerizing are simultaneously performed, carrying out the combining and polymerization reaction under vacuum is preferred from the viewpoint of productivity and strength.

A specific, preferred method is one in which a kneader with its inner space set to a reduced pressure is used to knead the resin precursor and the reinforcing fiber to allow polycondensation to proceed.

A method other than the above method may be used to obtain a fiber-reinforced composite material, and an example of the other method is one configured to use a Va-RTM apparatus or a vacuum press to feed the resin precursor to the reinforcing fiber during heating under vacuum (reduced pressure) and perform the combining and polycondensation simultaneously under vacuum.

The apparatus that can create a vacuum (reduced pressure) condition during polymerization reaction of the resin precursor (during heating for polycondensation reaction) is not particularly limited. A method using a Va-RTM apparatus, a vacuum press, or the like can be employed. The use of such an apparatus for carrying out the polymerization can result in a fiber-reinforced composite material free of voids and having high mechanical strength.

Additionally, when polycondensation reaction of the resin precursor is carried out using a Va-RTM apparatus, a vacuum press, or the like, forming of the fiber-reinforced composite material into a shape such as a plate or sheet shape can be simultaneously accomplished.

In the case of using a Va-RTM apparatus, a vacuum press, or the like, the pressure applied to the fiber-reinforced composite material during polycondensation reaction of the resin precursor is not particularly limited, but is preferably from 0.1 to 30 MPa, more preferably from 0.5 to 30 MPa, in order to remove voids remaining in the composite material to be formed. From the viewpoint of the use of common equipment, the applied pressure is even more preferably from 0.5 to 10 MPa and particularly preferably from 0.5 to 5 MPa.

A composite material obtained according to the present embodiment has high strength and, in particular, has a high flexural strength and a high flexural modulus. The flexural strength and flexural modulus can be evaluated by conducting a flexural property test on the composite material formed in a plate shape. The flexural property test can be conducted, for example, by a three-point bending test using Autograph AG 5000B (available from Shimadzu Corporation).

In the present embodiment, the flexural strength of the composite material comprising glass fiber as the reinforcing fiber is preferably 500 MPa or more and more preferably from 500 to 800 MPa. The flexural modulus is preferably 28 GPa or more and more preferably from 28 to 50 GPa.

Hereinafter, the present invention will be described in more detail by Examples and Comparative Examples. However, the present invention is not limited thereto.

<Flexural Property Test>

The flexural property test of thermoplastic composite materials of Examples and Comparative Examples was conducted by three-point bending using Autograph AG 5000B (available from Shimadzu Corporation). The test specimen had a shape with a height h of 1.5 mm, a width b of 15 mm, and a length l of 60 mm, and the bending span was 40 mm. The measurement temperature was 25° C.

<Preparation of Resin Precursor A>

To prepare a precursor of polyamide resin, 90 g of sebacic acid which is a dicarboxylic acid, 80 mg of sodium acetate as an additive, and 80 mg of sodium hypophosphite monohydrate as an additive were placed in a reaction vessel and melted at 145° C. under a flow of nitrogen gas. To the melt was slowly added dropwise 60.1 g of a mixture of m-xylylenediamine and p-xylylenediamine as diamine components. The dropwise addition was followed by a temperature increase to 200 to 230° C. and then melt stirring at ordinary pressure for 20 to 30 minutes, to thereby obtain resin precursor A.

The melt viscosity of resin precursor A as obtained above was measured using a capillary rheometer (CAPILOGRAPH, available from Toyo Seiki Seisaku-sho, Ltd.) and was 20 to 80 Pa·s under conditions of a temperature of 220° C. and a shear velocity of 1200 $s^{-1}$. For the thermoplastic composite materials of Examples 1 to 3 described below, resin precursor A having a melt viscosity of 72 Pa·s was used.

EXAMPLE 1

A glass fiber roving having a diameter of 12 μm was cut into 40-mm-long pieces, which were closely loaded into a press mold having the shape of a rectangular parallelepiped having dimensions of 100 mm (W)×100 mm (D)×1.5 mm (H). Resin precursor A (melt viscosity=72 Pa·s) ground into a powder was further added into the mold. The press mold charged with 70 vol % of the resin precursor and 30 vol % of glass fiber was subjected to hot pressing under conditions of 260° C. and 3.5 MPa under a reduced-pressure condition of 0.01 MPa for 30 minutes. Thus, a fiber-reinforced composite material formed in a plate shape was obtained. The physical properties of the obtained composite material are shown in Table 1.

EXAMPLE 2

A fiber-reinforced composite material was obtained in the same manner as in Example 1, except that the proportion of resin precursor A was 55 vol % and the proportion of glass fiber was 45 vol %. The physical properties of the obtained composite material are shown in Table 1. A cross-sectional SEM image (SEM-EDX: JSM-6460LA, available from JEOL Ltd.) of the obtained composite material is shown in FIG. 1. In FIG. 1, white discs correspond to the cross-sections of the fibers of glass.

In comparison to Example 1, the content ratio by volume of glass fiber in the composite material was high, and an improvement in flexural strength was observed.

EXAMPLE 3

A fiber-reinforced composite material was obtained in the same manner as in Example 2, except that the reduced pressure condition in hot pressing was changed to 0.001 MPa. The physical properties of the obtained composite material are shown in Table 1.

It was observed that the change of the reduced pressure condition in hot pressing to 0.001 MPa gave a further improvement in flexural strength.

<Preparation of Thermoplastic Resin B>

Polycondensation reaction of a dicarboxylic acid and diamines was allowed to proceed according to the same starting material composition as for resin precursor A. The dropwise addition of the diamines was followed by a temperature increase to 250° C., which was followed by a pressure reduction to 0.05 MPa so as to remove produced water from the reaction system. Thus, thermoplastic resin B having a high degree of polymerization was obtained.

The melt viscosity of thermoplastic resin B as obtained above was measured using a capillary rheometer (CAPILOGRAPH, available from Toyo Seiki Seisaku-sho, Ltd.) and was 380 Pa·s under conditions of a temperature of 220° C. and a shear velocity of 1200 $s^{-1}$.

COMPARATIVE EXAMPLE 1

A fiber-reinforced composite material was obtained in the same manner as in Example 1, except that thermoplastic resin B was used instead of resin precursor A. The physical properties of the obtained composite material are shown in Table 1.

COMPARATIVE EXAMPLE 2

A fiber-reinforced composite material was obtained in the same manner as in Example 2, except that thermoplastic resin B was used instead of resin precursor A. The physical properties of the obtained composite material are shown in Table 1. A cross-sectional SEM image (taken under the same conditions as in Example 2) of the obtained composite material is shown in FIG. 2. In FIG. 2, white discs correspond to the cross-sections of the fibers of glass.

As a result, the value of the flexural strength was lower not only than that in Example 2 but also than that in Comparative Example 1. A possible reason for this is that thermoplastic resin B, having a high melt viscosity, failed to completely impregnate the inside of the glass fiber roving used and thus voids (portions surrounded by an ellipse or a circle in FIG. 2) were formed at some sites. The influence of voids is inferred to have been more significant in Comparative Example 2 than in Comparative Example 1 because the fiber content in Comparative Example 2 was higher than that in Comparative Example 1.

COMPARATIVE EXAMPLE 3

A fiber-reinforced composite material was obtained in the same manner as in Example 3, except that thermoplastic resin B was used instead of resin precursor A. The physical properties of the obtained composite material are shown in Table 1. By virtue of the change of the reduced pressure condition in hot pressing to 0.001 MPa, no voids were observed by visual inspection of a cross-sectional image (not shown) of the composite material. However, as a result, the value of the flexural strength was lower than that in Example 3.

REFERENCE EXAMPLE

The flexural properties of "Tepex dynalite 101" available from Bond Laminates GmbH, which is a glass cloth impregnated with nylon 66, were also measured in the same manner as those of Examples 1 to 3 and Comparative Examples 1 to 3. "Tepex dynalite 101" is a composite material in which a continuous fiber woven fabric is used as a reinforcing fiber. The physical properties of the obtained composite material are shown in Table 1.

TABLE 1

| Volume percentage of components for forming composite material | Example 1 | Example 2 | Example 3 | Comparative Example 1 | Comparative Example 2 | Comparative Example 3 | Reference Example |
|---|---|---|---|---|---|---|---|
| Resin precursor A (%) | 70 | 55 | 55 | | | | Unspecified |
| Thermoplastic resin B (%) | | | | 70 | 55 | 55 | |
| Glass fiber (%) | 30 | 45 | 45 | 30 | 45 | 45 | |
| Reduced pressure condition in hot pressing (MPa) | 0.01 | 0.01 | 0.001 | 0.01 | 0.01 | 0.001 | |
| Flexural strength (MPa) | 515 | 622 | 909 | 491 | 435 | 628 | 397 |
| Flexural modulus (GPa) | 28 | 42 | 40 | 17 | 27 | 33 | 16 |

As is apparent from Table 1, it was demonstrated that a thermoplastic resin composite material, which was obtained by impregnating glass fiber with a precursor of thermoplastic resin, namely an oligomer, and then polymerizing the oligomer under reduced pressure, is a material that exhibits good mechanical properties.

In particular, when the reduced pressure condition in hot pressing was 0.001 MPa, a composite material having a very high flexural strength was obtained.

INDUSTRIAL APPLICABILITY

As described thus far, a thermoplastic resin composite material obtained by the production method of the present invention has high rigidity and strength and can be used in various applications. In particular, such a composite material is preferably used in applications such as in aircraft or automobile parts which are required to have a low weight and high strength.

This application claims the priority based on the Japanese patent applications (Japanese Patent Application No. 2016-139900 and Japanese Patent Application No. 2017-093103) filed with the Japan Patent Office on Jul. 15, 2016 and May 9, 2017, respectively, the entire contents of which are incorporated herein by reference.

The invention claimed is:

1. A method for producing a composite material, comprising:
   combining a solid resin precursor and a reinforcing fiber; and
   polycondensing the resin precursor with pressing under vacuum of a degree of vacuum of 0.005 MPa or less.

2. The method for producing the composite material according to claim 1, wherein the resin precursor is an oligomer of a thermoplastic resin.

3. The method for producing the composite material according to claim 1, wherein the resin precursor has a viscosity of from 1 to 100 Pa·s, the viscosity being measured by using a capillary rheometer under conditions of a temperature of 220° C. and a shear velocity of 1200 s$^{-1}$.

4. The method for producing the composite material according to claim 1, wherein the resin precursor comprises at least one selected from the group consisting of polyamide, polyester, polycarbonate, polyether, polysulfide and ketone-based resin.

5. The method for producing the composite material according to claim 1, wherein the reinforcing fiber comprises at least one selected from the group consisting of glass fiber, carbon fiber, basalt fiber, SiC fiber, and organic fiber.

6. The method for producing the composite material according to claim 1, wherein a proportion of the reinforcing fiber in the composite material is from 1 to 90 vol %.

7. The method for producing the composite material according to claim 1, wherein the reinforcing fiber is a discontinuous fiber material.

8. The method for producing the composite material according to claim 7, wherein the discontinuous fiber material comprises at least one selected from the group consisting of a roving, a non-woven fabric, and a tape.

9. The method for producing the composite material according to claim 7, wherein the discontinuous fiber material has a fiber length of from 0.5 mm to 100 mm.

10. The method for producing the composite material according to claim 1, wherein the reinforcing fiber is a continuous fiber material.

11. The method for producing the composite material according to claim 10, wherein the continuous fiber material is unidirectional fiber, a woven fabric, a knitted fabric, or a braided fabric.

12. The method for producing the composite material according to claim 1, wherein the combining is performed by any one of an immersion process, an impregnation process, and a kneading process.

13. The method for producing the composite material according to claim 1, wherein a reaction temperature in the polycondensing is from 100° C. to 400° C.

14. The method for producing the composite material according to claim 1, wherein a pressure of the pressing is from 0.1 to 30 MPa.

15. The method for producing the composite material according to claim 1, wherein in the polycondensing, pressing is simultaneously performed.

16. The method for producing the composite material according to claim 15, wherein the pressing is performed by a vacuum pressing process.

17. The method for producing the composite material according to claim 16, wherein a pressure of the vacuum pressing process is from 0.1 to 30 MPa.

* * * * *